United States Patent [19]

Sakai et al.

[11] Patent Number: 4,509,841

[45] Date of Patent: Apr. 9, 1985

[54] AUTOMATIC FOCUSING DEVICE

[75] Inventors: Shinji Sakai, Tokyo; Takashi Kawabata, Kanagawa, both of Japan

[73] Assignee: Canon Kabushiki Kaisha, Tokyo, Japan

[21] Appl. No.: 448,693

[22] Filed: Dec. 10, 1982

[30] Foreign Application Priority Data

Dec. 17, 1981 [JP] Japan .................. 56-204953
Dec. 18, 1981 [JP] Japan .................. 56-205786
Dec. 18, 1981 [JP] Japan .................. 56-205789

[51] Int. Cl.³ ............................................. G03B 3/10
[52] U.S. Cl. ......................................................... 354/400
[58] Field of Search ............... 354/25 R, 25 A, 25 P, 354/25 N, 195, 400–409

[56] References Cited

U.S. PATENT DOCUMENTS 4,200,378  4/1980  Shenk .................................. 354/195

Primary Examiner—William B. Perkey
Attorney, Agent, or Firm—Toren, McGeady and Stanger

[57] ABSTRACT

The disclosed automatic focusing device operates by detecting a motor signal which is produced according to the lens movement and by forming a limit signal when the motor signal is not produced for a period longer than a predetermined time. A reference signal forming circuit produces a reference signal corresponding to the shift in focus per unit time. The motor signal is compared with the reference signal and the lens drive speed is adjusted to reduce the difference between the two signals. The invention avoids a mechanical limit switch and maintains an unvarying shift in focus per unit time for different kinds of lenses.

18 Claims, 11 Drawing Figures

IN-FOCUS POINT

AUTOMATIC FOCUSING DEVICE

BACKGROUND OF THE INVENTION

1. Field of the Invention

This invention relates to a lens control device suited for automatic focusing, and the like.

2. Description of the Prior Art

In lenses of the kind that are driven for purposes such as automatic focusing, zooming, and for similar effects, the range of lens movement is limited. Therefore, when such a lens reaches the limit of movement during a lens driving process, the arrival at the limit must be detected by some means. In a conventional arrangement, a limit switch is provided at the limit of lens motion in order to detect arrival at the limit. This method of providing such a mechanical switch, however, is not only disadvantageous in terms of its structural arrangement but also necessitates a troublesome adjustment of the limit position relative to the lens. It has been, therefore, difficult to arrange for precise limit detection.

In addition to this, it has been another problem in conventional lens structures that, in driving the lens for automatic focusing, it is not possible to adjust the defocusing or degree of focus shift as a function of unit time at a fixed rate. More specifically stated, even if the lens is driven at a constant driving speed, the degree of shift in the focus varies with the kind of the lens. For example, it varies when zoom lenses of different zoom ratios are used and it also becomes completely different between a telephoto application and a wide-angle application of a zoom lens. Therefore, even if the lens driving speed is made constant to obtain a constant shift in focus per unit time for focus adjustment in a telephoto application of a zoom lens, the extent of focus shift per unit time becomes slower when the zoom lens is used for a wide-angle application. Thus, focusing action becomes slower on wide-angle application than in telephoto application.

SUMMARY OF THE INVENTION

It is therefore an object of the invention to provide an automatic focusing device which solves the above stated problems of the prior art and to generate a limit signal by utilizing a signal that reflects automatic focusing lens driving action, so that the problem relative to limit detection can be solved in a way that ensures an accurate and speedy automatic focusing operation with a simple structure.

It is another object of the invention to provide an automatic focusing device in which a motor signal generator produces a motor signal which varies with the movement of a lens in use and a limit signal generator for producing a limit signal which indicates arrival of the lens at a limit position when the motor signal is not generated within a predetermined period of time during the lens driving process, so that the above stated problem of limit detection can be solved.

It is a further object of the invention to provide an automatic focusing device which, in performing the limit through the limit signal generator, adjusts the above stated predetermined time to a time that corresponds to a focus shift in degree per time unit during the lens driving process, so that accurate limit detection can be ensured.

It is a further object of the invention to provide an automatic focusing device wherein, in driving the lens, a motor signal is produced that is related to the lens driving action; the lens driving speed of the driving action is controlled according to this motor signal to make the degree of focus shift as a function of unit time of the lens driving process unvarying, so that the above stated problem relative to lens driving can be solved.

It is a still further object of the invention to provide an automatic focusing device wherein, in controlling the lens driving speed through the motor signal, information on the degree in focal shift per unit time for the lens in use is detected and the lens driving speed is adjusted according to this information in order to make the extent of the shift in the focus per unit time always unvarying, so that the above stated problem relative to lens driving can be solved.

These and further objects and features of the invention will become apparent from the following detailed description of preferred embodiments thereof taken in connection with the accompanying drawings.

DETAILED DESCRIPTION OF THE PREFERRED EMBODIMENTS

Figure 1:
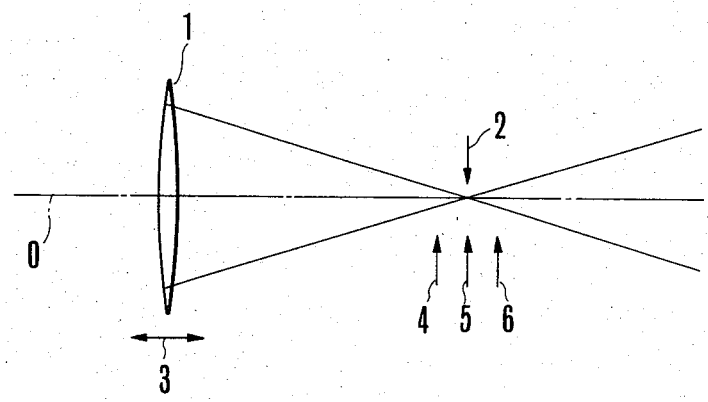
FIG. 1 is a schematic illustration of a focus detecting method for an automatic focusing device according to the present invention

FIG. 1 shows the focus detecting method for an automatic focusing device according to the invention. A photo-taking lens 1 is arranged to move along the optical axis 0 back and forth as indicated by an arrow 3 to form the image of an object on a predetermined imaging plane 2. To detect the focused state of the image, images obtained at a position 5 of the lens that is equivalent to the predetermined imaging plane 2 and at other positions located on either side of the equivalent position, such as the points indicated by reference numerals 4 and 6 in FIG. 1, are converted into electrical signals through sensors and then are compared. The degree of defocus of the image relative to the predetermined imaging plane 2 is computed through this comparison process. The lens 1 is then moved according to the result of computation and is stopped at a proper position.

Figure 2:
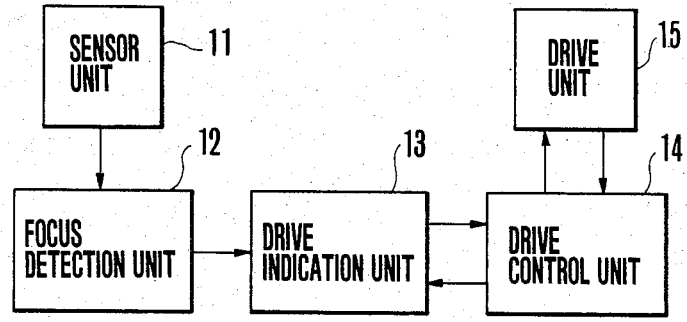
FIG. 2 is a system block diagram schematically showing the arrangement of functional units of an automatic focusing device according to the invention

Referring to FIG. 2, images sensed at the positions 4, 5 and 6 are converted into electrical signals through a sensor unit 11, the electrical signals from which are supplied a focus detection unit 12. The focus detection unit detects the degree of defocus and determines whether the images thus obtained are in focus or out of focus. A drive indication or instruction unit 13 computes a length of drive that is required for accurately and quickly obtaining an in-focus state. A drive control unit 14 thus regulates a drive unit 15 according to the driving length that is thus obtained.

Figure 3:
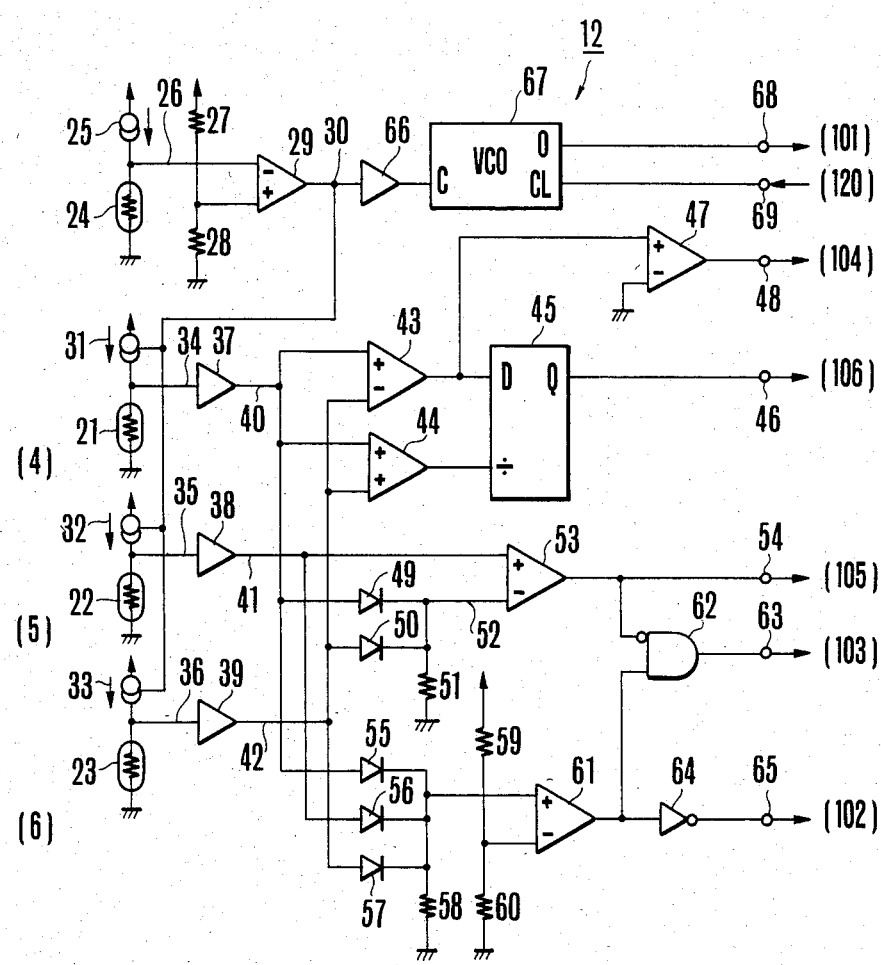
FIG. 3 is an illustrative circuit diagram that shows a focus detection unit shown in FIG. 4

The focus detection unit 12 is arranged as shown in FIG. 3. In FIG. 3, sensor 21, 22 and 23 are positioned to respond to regions equivalent to the positions 4, 5 and 6. Another sensor 24 responds to an approximately equivalent region for brightness stabilization. For this purpose, a constant current is supplied from a constant current source 25 to the sensor 24 in such a manner that a conductor 26 has a voltage level which is inversely proportional to the brightness of the distance measuring region, that is, a signal is produced, the level of which decreases as the brightness increases. This brightness signal is differentially amplified in a differential amplifier 29 relative to a reference potential that is determined by resistors 27 and 28 to produce in a conductor 30 a signal the level of which increases as the brightness increases. This signal controls constant current circuits 31, 32 and 33 to cause the currents from these circuits to increase with image brightness in such a manner that the level of a signal produced at each of points 34, 35 and 36 corresponds solely to image sharpness without regard to the brightness of ambient light.

In other words, a driving current which varies with the brightness of the ambient light is coupled to each of the sensors 21, 22 and 23. The output level of each of the sensors 21, 22 and 23 is thus determined solely through image sharpness in spite of the ambient light intensity.

Signals representing the image sharpness obtained at a prescribed focal plane and at positions located to either side thereof are amplified by amplifiers 37, 38 and 39. Through this process, conductors 40, 41 and 42 conduct sharpness signals respectively for the position before the prescribed focal plane (or the position 4 shown in FIG. 1), the prescribed focal plane (the position 5 shown in FIG. 1) and the position after the prescribed focal plane (the position 6 shown in FIG. 1). The signal levels in the conductors 40, 41 and 42 are controlled through the amplifiers to which they are coupled to increase with the image sharpness. Of the three signals, the two signals in the conductors 40 and 42 are supplied to a differential amplifier 43 to obtain a signal that corresponds to the degree of difference between the sharpness of the images formed at the positions before and after the prescribed imaging plane (i.e., the positions 4 and 6 shown in FIG. 1). At the same time, the sum of the degree of sharpness of the images before and after the prescribed imaging plane is obtained from an addition amplifier 44. The signal that corresponds to the two values thus obtained are supplied to a divider circuit 45 to rate the sharpness of the image of an object that is to be photographed by dividing the difference signal with the sum signal. Then a signal proportional to the images obtained at the positions before and after the prescribed imaging plane i.e. a signal representative of a degree of defocus is produced at a terminal 46.

Figure 4:
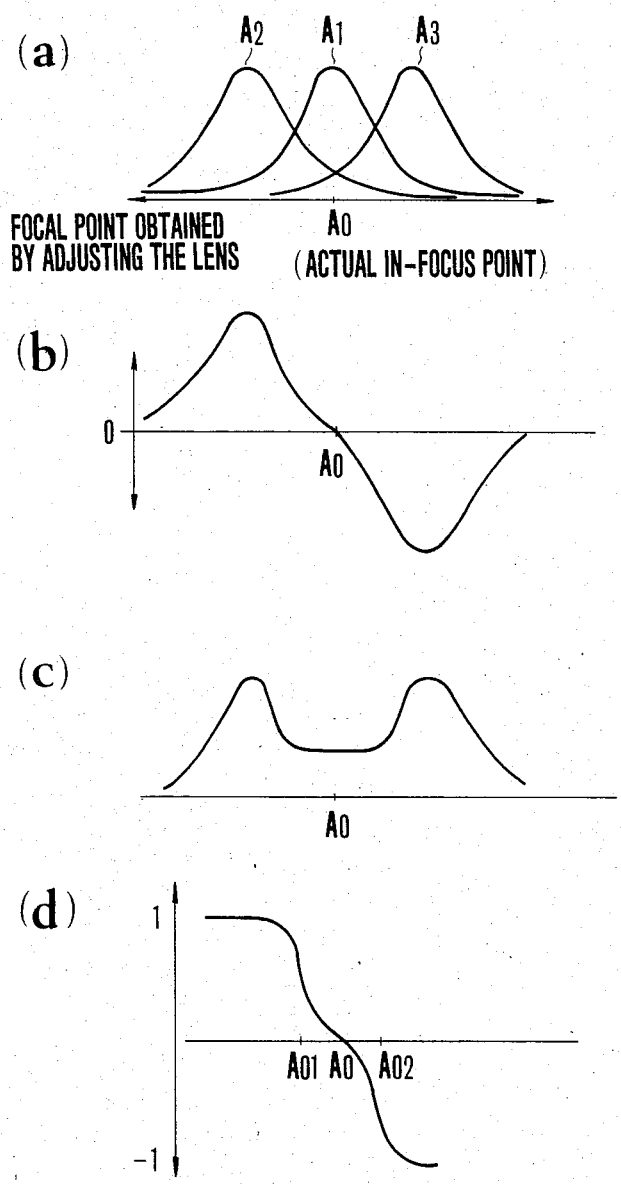
FIG. 4 is a wave form chart showing the defocus degree detecting action of the focus detection unit shown in FIG. 3.

More specifically, assuming that the output of the conductor 41 varies as represented by curve A1 in FIG. 4(a), the output (a sharpness signal) signal in the conductor 40 as represented by curve A2 and that of the conductor 42 as represented by curve A3 in FIG. 4(a), a difference between the outputs of conductors 40 and 42 obtained from the amplifier 43 results in a difference signal which is as shown in FIG. 4(b). Meanwhile, the sum of the output signals in the conductors 40 and 42 obtained from the amplifier 44 becomes as shown in FIG. 4(c). Therefore, with the wave form value of FIG. 4(b) divided by the wave form value of FIG. 4(c), the signal from the divider circuit 45 becomes as shown in FIG. 4(d). As apparent from the wave form in FIG. 4(d), the divider circuit 45 produces a functional signal which becomes a minimum value at an in-focus point while the output signal as an absolute value increases as the degree of deviation increases. The degree or extent of the defocus from the in-focus point is obtained in this manner. The output of the amplifier 43 is supplied to a comparator 47, which detects the focus direction. In other words, when the output signal in the conductor 40 is higher than the output signal in the conductor 42, that is, when an image is formed at the position 4 shown in FIG. 4 in front of the in-focus point and the sharpness at the front position is higher than the in-focus point (in the region on the left hand side of the in-focus point A0 as shown in FIG. 4(a)), the amplifier 43 produces a positive output as shown in FIG. 4(b). Accordingly the comparator 47 produces a high level output signal to indicate that the lens should be moved from a near-focus position (a state in which an image is formed in front of the in-focus point) toward a far-focus position (in which an image is formed in the rear of the in-focus point).

Conversely, when the output level of the signal in the conductor 40 is higher than the signal in the conductor 42, that is, when the image is formed in the region on the right hand side of the in-focus point as shown in FIG. 4(a), the amplifier 43 produces a negative signal as shown in FIG. 4(b). The comparator 47, therefore, produces a low level output signal to indicate that the lens should be moved from a far-focus position toward a near-focus position. The focusing direction and the defocus degree are detected in the manner as described above.

However, the defocus degree is accurately obtainable from the terminal 46 only when the imaging point is within the internal region of the sensor 21 and 23. Accurate determination of defocusing degree is hardly possible when the image is widely blurred across all the positions 4, 5 and 6. In view of this, diodes 49 and 50 and a resistor 51 are coupled to a conductor 52 to obtain a signal of higher level from the sharpness signals in the conductors 40 and 42. Then, this signal is compared through a comparator 53 with the signal in the conductor 41 which represents the sharpness in the prescribed focal plane. When the sharpness at the prescribed focal plane is higher than the degree of sharpness at the planes before and after the prescribed focal plane, that is, when the imaging plane is located at a point within the internal region of the sensors 21 or 23 or when the degree of defocus is of an accurate or reliable value (or an established value), a high level output is produced at a terminal 54. In other words, the degree of defocus is obtained as a function when the image is formed in the vicinity of the in-focus point as shown in FIG. 4(d). When the image is formed, however, at a position that is farther away from the in-focus point than the point A01 or the point A02 as shown in FIG. 4(d), the signal representing the defocus degree is not an accurate function.

Even beyond that region, however, if the image is not excessively blurred for the sensor in the above stated focusing direction, it is still possible to obtain accurate information. Therefore, with the output of the conductor 41 compared with the outputs in the conductors 40 and 42 (curves A2 and A3 in FIG. 4(a)) by the comparator 53, if the result result of comparison is within the region between A01 and A02 as shown in FIG. 4(d), the comparator 53 produces a high level output signal to indicate that the defocus degree signal at the terminal 46 is accurate.

Because it is possible that the outputs of the sensors 21, 22 and 23 become inaccurate due to excessive blur, such blurring is detected in the following manner: The outputs of these sensors are supplied to a circuit consisting of diodes 55, 56 and 57 and a resistor 58 to obtain a degree of maximum sharpness. The signal thus obtained is compared through a comparator 61 with a reference value defined by resistors 59 and 60. If the result of this comparison indicates a sufficient degree of sharpness (if an accurate direction can be detected in the focusing direction), the comparator 61 produces a high level output signal. In other words, even if an image is formed at a point beyond the region A01–A02 of FIG. 4(d), if the image is not extremely blurred, accurate information is obtainable about the focusing direction. In such a case, therefore, the sensor output (the sharpness signal) is compared with the reference value and, with the exception of extreme blur, a high level output signal is generated by the comparator 61 and is supplied to an AND gate 62. Meanwhile, when the degree of defocus is not accurate, the comparator 53 produces a low level output signal as mentioned above. Therefore, the AND gate 62 produces a high level output signal only when accurate information is obtainable with respect to the focusing direction. The high level output of the AND gate 62 is then transmitted to the terminal 63.

In case of extreme blur where no reliable signal or information is obtainable both for the defocus degree and for focusing direction, the output level of the comparator 61 becomes low. The low output is inverted at an inverter 64 to have a terminal 65 produce a high level output to indicate that the signal is not reliable.

The response of every circuit mentioned in the foregoing becomes slow under a dark condition. In view of this, the brightness in the conductor 30 mentioned in the foregoing is supplied to a voltage control oscillator 67 through an amplifier 66. Under a bright condition, pulses generated by the oscillator 67 are produced at a high frequency as a distance measurement timing signal to allow a distance measuring action to be performed at a high speed. Under a dark condition, low frequency pulses are produced at a terminal 68 to cause the distance measuring action to be performed at a relatively low speed. Further, in cases where the illumination level responsivity can be disregarded, the pulses which the oscillator 67 generate, may be produced at a fixed period without regard to the brightness condition. In such a case, the pulses which are used as timing signal can be produced at a fixed period by disconnecting the amplifier 66 from the oscillator 67.

Further, while the lens is being driven, i.e. during a time in which a motor is driving the lens, the sensor outputs continuously vary thereby often resulting in an erroneous distance measurement if the signals from the oscillator 67 are produced during the lens driving process. Therefore, during this process, the voltage control oscillator 67 is cleared and rendered inoperative to prevent it from producing erroneous strobing pulses by arranging the drive control unit, which will be described later herein, to supply terminal 69 with a signal, the level of which becomes high during the lens driving process. With this signal supplied to the terminal 69, distance adjustment on the basis of distance measurement data is not performed. In case storage type sensors, such as CCD, are employed as the sensors 21, 22 and 23, erroneous storage can be prevented by arranging the sensors to enter a new storage sequence after the level of the drive signal has become low.

While a distance measuring device of the blur detecting type has been described in the foregoing embodiment of the invention, the invention is also applicable to distance measuring devices of completely different types such as an image deviation type device. In that case, the region for reliable defocus computation is also limited. The accuracy of computation degrades when great deviation takes place. The direction determining accuracy also degrades in the case of great defocus such as an excessively blurred image (for example, in the case of a flat object or the like). In accordance with the invention, therefore, a signal representing that the defocus degree is an accurate value, a signal representing that only the focusing direction is accurate, and a signal indicating that both the defocus degree and the focusing direction are inaccurate can also be generated in a device in the same manner as in the embodiment of the invention in the foregoing description.

Figure 5:
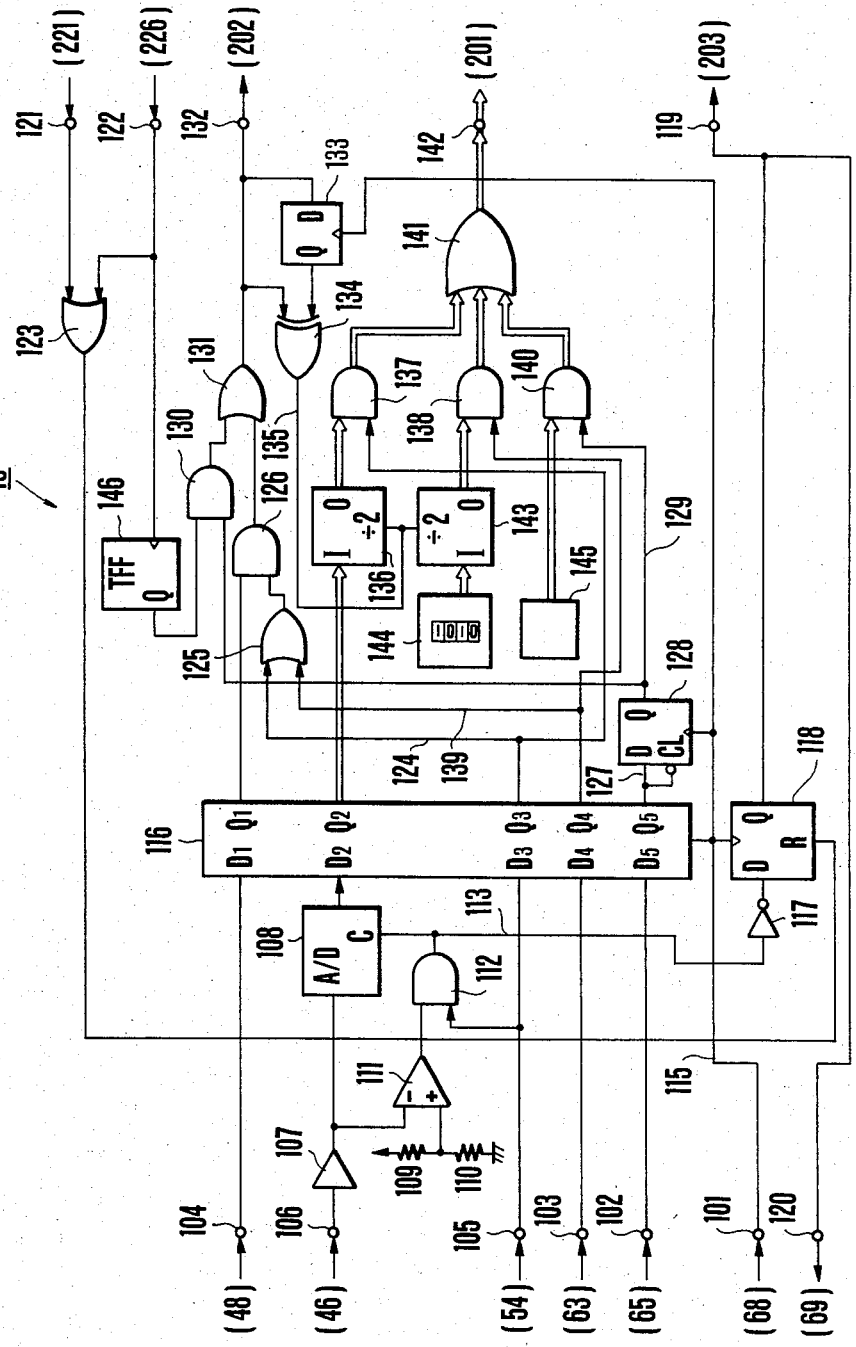
FIG. 5 is an illustrative circuit diagram for a drive indication or instruction unit shown in FIG. 2.

An example of the drive indication or instruction unit 13 mentioned in connection with FIG. 1 is shown in FIG. 5. Referring to FIG. 5, the timing pulses at the terminal 68 are supplied from the focus direction unit 12 to a terminal 101. In the case where both the focusing direction and the defocus degree are uncertain, the high level output at the terminal 65 is supplied as an uncertainty signal to a terminal 102. When only the focusing direction is certain, the high level output at the terminal 63 is supplied to a terminal 103 as a directional certainty signal. Meanwhile, a direction signal which represents the focusing direction at the terminal 48 is supplied to a terminal 104. Further, when the image is within the defocus degree computable region, the high level output at a terminal 54 is supplied to a terminal 105 as a certainty signal for the degree of defocus. In that instance, the defocus degree signal which is the output from the terminal 46 is applied to a terminal 106.

The defocus degree signal which is obtained from the divider 45 and supplied to the terminal 106 is made into an absolute value by an absolute value circuit 107 which is composed of, for example, a full-wave rectifier circuit. This absolute value signal is further converted into a digital value by an A-D converter 108. After that, distance adjustment is performed on the basis of the digitalized value signal. To simplify the description, the operation subsequent to the detection of the distance measurement data will be described through different cases as follows:

(1) When the lens position is detected through the detection of the distance measurement data to be in an in-focus state, that is, within an automatic focusing adjustment region: In this case, the level of the signal which is representative of a degree of defocus is supplied to the terminal 106 at a value that is lower than a given level. Therefore, with the defocus degree compared with the reference level defined by resistors 109 and 110 by a comparator 111, the result of comparison becomes a high level output. This high level comparison output and the certainty signal for the defocus degree which comes from the terminal 105 as a high level output both are supplied to an AND gate 112. This results in a high level output from the AND gate 112. This high level AND gate output is changed to a low level through an inverter 117 and then is impressed on input terminal D of a D type flip-flop 18 (hereinafter will be called DFF). This DFF 118 is set in synchronism with the pulses from the oscillator 67. However, since at that instant the above stated low level input is impressed on the input terminal D of the DFF, the output level of the DFF becomes low and the low output is supplied to a terminal 119. This terminal 119 is connected to a drive signal terminal for the lens drive control unit which will be described later herein. Since the lens is not driven in response to this low level output, the lens is kept in the in-focus state. Further, at that instant, the high level output of the AND gate 112 is transmitted to the A-D converter 108 to clear the converter 108. If the reference level to be defined by the resistors 109 and 110 is adjusted according to the phototaking aperture value of the lens in use, the in-focus region can be determined in response to the aperture value of the lens. In such a case, the focal point setting range (or distance setting range) of the lens which can be regarded as an in-focus range may become wider according to the aperture value of the lens that is being used. Such an arrangement therefore permits the quick completion of a distance adjustment action to prevent an unnecessary lens adjustment for the in-focus position.

(2) When the lens position is not in-focus: In this case, the output level of the comparator 111 becomes low. Therefore, the output level of the AND gate also becomes low. The A-D converter 108 then converts the defocus degree signal from the absolute value circuit 107 into a digital value. Meanwhile, the pulses from the oscillator 67 are supplied to the conductor 115. The pulses are then transmitted to a latch circuit 116 which consists of a plurality of DFFs. In synchronism with the pulses, the latch circuit 116 latches the signals which have been supplied to the input terminals D1 through D5 as distance measurement data. Further, the DDF 118 is set by the pulses and produces a high level output at the output terminal Q. The high level output of the DFF 118 is then transmitted to the lens drive unit through a terminal 119 to cause the lens to be driven. The high level output of the DFF 118 is also transmitted to the oscillator 67 by way of the terminal 69 (FIG. 3) to render it inoperative, so that new data are inhibited from being supplied to the latch circuit 116 while the lens is being driven.

(2)-(a) When the defocus degree is of a reliable (or accurate) value while the lens position is not in-focus: As has been described in the foregoing, a high level output representing the certainty of the defocus degree is supplied from the terminal 54 to the terminal 105 in this case. Low level inputs are supplied to terminals 102 and 103 from the terminals 65 and 63. This causes the level of input D3 to become high and the level of output Q3 of the latch circuit 116 also to become high in synchronism with the pulses and to apply an high level signal to a conductor 124. The output level of an OR gate also becomes high to open an AND gate 126. At that time, the uncertainty signal of the terminal 102 is at a low level as mentioned above; the level of the corresponding output Q5 of the latch 116 is therefore low and the signal level in conductor 127 is also low. Accordingly, because the level of an inverted, clear conductor 129 is low, a D flip-flop 128 produces a low level signal at its output terminal Q. An AND gate 130 is therefore closed. With the AND gate 126 opened as mentioned above, a focusing direction signal which is supplied from terminal 104 to terminal D1 in the latch 116 is transmitted from the corresponding output terminal Q5 to a terminal 132 through an OR gate 131. This signal is an instruction to drive the lens in that direction.

There also is provided a D flip-flop 133 for storing a signal that represents the focusing direction detected through a previous distance measuring action. This flip-flop 133 is clocked by pulses from the pulse oscillator 67 through the conductor 115.

When the direction instructed is unchanged from the previously instructed direction, the signal in the conductor 132 and the output Q of the flip-flop 133 coincide with each other at exclusive OR gate 134 without regard to the direction. Therefore, the exclusive OR gate 134 applies a low level output to a conductor 135. A divider circuit 136, which produces one half at the output of the divider input allows the whole input to pass therethrough without dividing by 2. Meanwhile, the high level signal from the conductor 124 opens an AND gate 137. (At that time, the level of the signal at the terminal 103 is low resulting in the low level of the output Q4 of the latch circuit 116. The level of the signal in a conductor 139 is, therefore, low to disable an AND gate 138. Further, the low level of the conductor 129 also causes another AND gate 140 to be closed). With the AND gate 137 thus being opened, a terminal 142 receives an instruction through an OR gate 141 with respect to the required degree of defocus. When the defocus degree ∅ is of an established value, the defocus degree is thus converted into a corresponding digital signal through the A-D converter 108. A defocus degree signal latched at the latch circuit 116 is produced at the terminal 142 through the output terminal Q2 of the latch circuit 116. Meanwhile, a focusing direction signal is produced from the terminal 132. The drive control unit, which will be described later herein, then causes the lens to be driven through a distance that corresponds to the degree of defocus in the direction determined by the focusing direction signal. With the lens driven the required distance, a conductor 121 has a high level output in the form of a single pulse. This output in the conductor 121 resets the DFF 118 to make the level of a drive signal from a terminal 119 low. The low level drive signal brings the lens driving motor of a lens drive circuit to a stop. With the DFF 118 reset, the oscillator 67 again begins to operate. With the operation of the oscillator resumed, the result of distance measurement detected through the circuit arrangement shown in FIG. 3 is again latched at the latch circuit 116. When the lens is driven to an in-focus position, the lens is kept in that position as mentioned in Para. (1) above. In cases where the lens driving action fails to bring the lens to an in-focus position or the object to be photographed happens to move, the processes described above are once again performed to drive the lens. Thus, the distance measuring action and the lens driving action according to the result of the distance measuring action are repeated until the lens is brough to an in-focus position.

The input terminals D1, D3, D4 and D5 of the latch circuit 116 are one-bit input terminals while another input terminal D2 responds to a number of bits from the output of the A-D converter 108. Likewise, the output terminals Q1, Q3, Q4 and Q5 of the latch circuit are one-bit output terminals while the output terminal Q2 generates the same number of bits as the input terminal D2.

Figure 6:
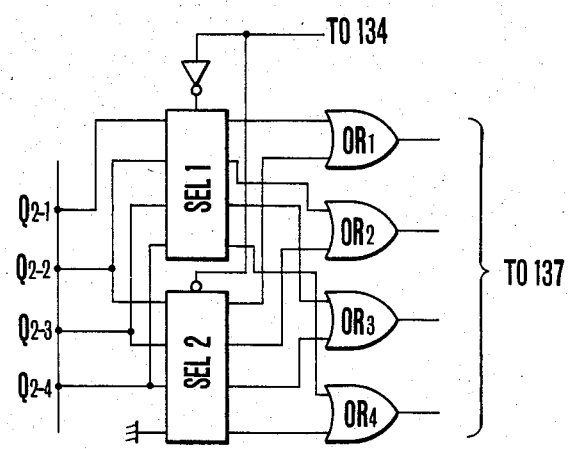
FIG. 6 is an illustrative circuit diagram of a dividing circuit 136 shown in FIG. 5.

The divider circuit 136, as shown in FIG. 6, consists of data selectors SEL1 and SEL2 and OR gates OR1 through OR4. When the output level of the exclusive OR gate 134 is low as mentioned in the foregoing, the selector SEL1 is selected through an inverter. Then, in that case, the outputs Q2-1 to Q2-4 of the latch output terminal Q2 are coupled as they are from the OR gates OR1–OR4. When the output level of the or gate 134 is high, the selector SEL2 is selected and the OR gate OR4 produces a low level output while outputs Q2-4–Q2-2 are produced from the OR gates OR3–OR1. With the selector SEL2 selected, the outputs of the latch circuit 116 are thus extracted from the divided after they are shifted by one bit, i.e. after they become $\frac{1}{2}$. In FIG. 6, the outputs of the latch circuit output terminal Q2 are shown as 4 bits including a first bit Q2-1 through a fourth bit Q2-4. However, the number of bits is not limited to four and the divider circuit 143 can also be connected in a similar manner. While the AND gates 137, 138 and 140 and the OR gate 141 are shown only in FIG. 5 to simplify the illustration, they actually should be provided in greater numbers corresponding to the number of output bits of the circuits 136, 143 and 145.

With the divider circuit 136 arranged as described above, when the focusing direction signal in the conductor 132 shows a direction that is different from the previous focusing direction as indicated through the signal held at the flip-flop 133 during the operation described above, the output level of the exclusive OR gate 134 becomes high. Then, the output Q2 of the latch circuit 116, i.e. the defocus degree, is reduced to one half by the divider circuit 136 to prevent oscillation at a point in the vicinity of the in-focus point.

Figure 7:
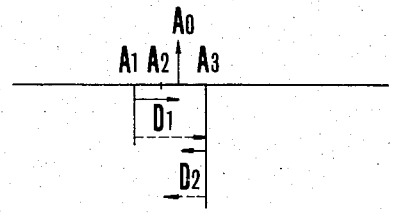
FIG. 7 is an illustration of the operation of the circuit shown in FIG. 5.

More specifically, when the lens is driven by the operation mentioned above to move to the extent of degree of defocus in the instructed direction, or, as shown in FIG. 7, when the lens is driven, for example, from a position A1 in the direction of arrow D1 through a distance that is as much as a defocus degree D1, thre is the possibility that the lens might overshoot and move to a point A3 beyond an in-focus A0. Such overshoot now results in a different focusing direction from the previous direction in the process of detecting the degree of defocus and the focusing direction. In that case, the lens is driven through a distance and in the direction of arrow D2 which corresponds to the degree of defocus in the reverse direction. Then, a second overshot brings the lens to another position A2. Therefore, if the lens is driven as much as the degree of defocus in the vicinity of the in-focus point the lens cannot be readily adjusted to the in-focus point A0 because of overshooting.

In accordance with the present invention, therefore, when a focusing direction that is different from the focusing direction of the previous instruction is obtained through the process at distance measurement, that is, when overshooting takes place, a high level output is generated by the exclusive OR gate 134 to cause the divider circuit 136 to produce a driving degree signal that corresponds to one half of the degree of defocus at the terminal 142. Accordingly, the lens is driven through a distance corresponding to one half of the degree of defocus to prevent overshoot and for quick adjustment of the lens to the in-focus position.

(2)-(b) When only the focusing direction is established while the lens is not in-focus: In this instance, the level of the terminal 54, or that of the terminal 105, becomes low, the level of the terminal 63, or that of the terminal 103, becomes high; the level of the terminal 65, or that of the terminal 102, becomes low as mentioned in the foregoing. The level of the output Q3 of the latch circuit 116 becomes low. The level of the output Q4 becomes high and that of the output Q5 low. Accordingly, the level of the signal in the conductor 124 becomes low, that of the conductor 139 high and those of conductors 127 and 129 low. This drives the lens a predetermined distance in the focusing direction thus determined. The focusing direction is determined as follows: The output level of the OR gate 125 is high because of the high level output signal in the conductor output 139. Then the focusing signal, which is latched at the latch circuit 116 and is established at the output terminal Q1 thereof, is coupled to a direction indication terminal 132 through the AND gate 126 and the OR gate 131.

Further, since the signal levels of the conductors 124 and 129 are low and the signal level of the conductor 139 is high, AND gates 137 and 140 are closed and an AND gate 138 is enabled. Therefore, through the AND gate 138, a constant setting element 144 which is composed of a register in which a digital value 1010, for example, corresponding to a predetermined constant is set applies this digital value to the terminal 142 as described in the foregoing. In this case, therefore, the lens is driven in the focusing direction indicated a given distance or extent based on data representing a given driving extent set at the constant setting element 144. After the lens is driven to a given extent in this manner, the high level output of the terminal 121 is supplied in the form of a single pulse to bring the lens driving action to a stop. Again the result of distance measurement is latched at the latch circuit 116. Then, the lens is driven once again according to the result of distance measurement. The lens is thus repeatedly driven to a given extent each time until there obtains the condition described in Para (2)-(a) above. Then, the embodiment performs the operation as described in Para. (2)-(a).

As for the predetermined driving extent to be set by the constant setting element 144, it is set at a value that does not often cause the movement of the lens to exceed an established defocusing range and also does not exceed a range for establishing the focusing direction. For example, the driving extent is set at 2 mm. Further, the constant may be adjusted according to the aperture value of the lens or the focal length of the lens. In driving the lens in response to the constant setting element 144, if the output level of the exclusive OR gate 134 is high, a divider circuit 143 is energized to drive the lens through a distance which is $\frac{1}{2}$ of the predetermined extent.

(2)-(c) When both the focusing direction and the defocus degree are uncertain while the lens position is not in-focus: The result of distance measurement by the circuit shown in FIG. 3 causes the levels of the terminals 105 and 103 to become low and that of the terminal 102 high. As a result of this combination, the signal in the conductor levels 124 and 139 become low while that of the line 127 becomes high. The uncertainty of the focusing direction sometimes momentarily and accidentally results from vibration of hands or the like.

However, in case of intrinsic uncertainty, a search is conducted over the whole region of the lens operation to adjust the lens position to an in-focus point which deviates greatly from a normal in-focus position. But, if such searching action begins even in response to a momentary vibration, such a searching action is not only detrimental to operability but also results in the loss of an in-focus point to which the lens has been already adjusted.

To solve this problem, there s provided a stabilizing circuit which is arranged in the following manner: When the level of the output Q5 of the latch circuit 116 is caused to become high by the high level output of the terminal 102 and thus results in the high level signal in the conductor 127, the flip-flop 128 is released from a reset state. Because the level of the output Q of the DFF 128 still remains low under this condition, the level of the conductor 129 does not become high. Since the signal levels in the conductors 124 and 139 are also low, the AND gates 126 and 130 are closed. Therefore, the level of the terminal also becomes low.

Because the AND gates 137, 138 and 140 are also closed, a signal of zero drive demanding quantity information is transmitted to the terminal 142 through the OR gate 141. As a result, the lens is not driven. This causes the conductor 121 to produce a high level output for a short period of time as will be further described later herein. This high level output signal in the conductor 121 is passed through the OR gate 123 to reset the DFF 118. With the DFF reset, the oscillator 67 is reactivated as described in the foregoing.

The result of distance measurement performed by the circuit shown in FIG. 3 is again set at the latch circuit 116. Assuming that the level of the output Q5 of the latch circuit 116 produced as a result of the second distance measurement is low, the DFF 128 is cleared and the level of the output Q of the DFF is kept at a low level. Therefore, the operation described in Para. (2)-(a) and -(b) above is performed in response to the second distance measurement. In a case in which the level of the output Q5 of the latch circuit 116 is high despite the second distance measurement, a high level output appears at the output terminal Q of the DFF 128. Therefore, the signal level in the conductor 129 becomes high only when the first and second results of distance measurement show, consecutively, that both the defocus degree and the focusing direction are uncertain.

When the output level of the conductor 129 becomes high in this manner, the AND gate 140 is opened to have the predetermined value which is set at the constant setting circuit or element 145 applied to the terminal 142 as a required lens driving distance. Then, the lens is driven through the predetermined extent in the direction determined in accordance with the focusing direction signal at the terminal 132.

The predetermined extent mentioned above in connection with the constant setting circuit 145 is larger than the value set in the constant setting element 144 and, moreover, is set at such a value that it permits a quick search over the whole lens driving range to find, without fail, an in-focus point, i.e. without exceeding a direction discernible range.

With the lens driven to the predetermined extent as mentioned above, the conductor 121 has an high level output signal for a short period of time to bring the lens driving action to a stop. Then, again, the result of the distance measurement performed by the circuit shown in FIG. 3 is latched at the latch circuit 116. Therefore, when the lens moves to the state described in Para. (2)-(b), the operation described in Para. (2)-(b) is performed thereafter. In case where the lens still remains in the state described in Para (2)-(c) in spite of the lens driving process, the lens driving action through the predetermined distance is repeated until the condition of the lens shifts to the conditions decribed in Paras (2)-(a) or (2)-(b).

Under the condition of (2)-(c), the focusing direction is inaccurate and, therefore, the lens might be driven in a direction that is opposite to the in-focus direction. In such a case, an end signal, which will be described later herein, is applied to the terminal 122 when the lens is thus driven to the extent of a limit. Since a T flip-flop (TFF) 146 is inverted in response to this end signal, the output of the AND gate 130 is inverted to invert the focusing direction signal that is to be supplied to the terminal 132. Therefore, when the lens is brought to the limit by the lens driving action to the predetermined extent, the lens driving direction is reversed to move it forward an in-focus point. Consequently, the lens is shifted to the state characterizing paragraph (2)-(a) or (2)-(b) and the action of driving the lens to the predetermined extent is repeatedly performed.

Figure 8:
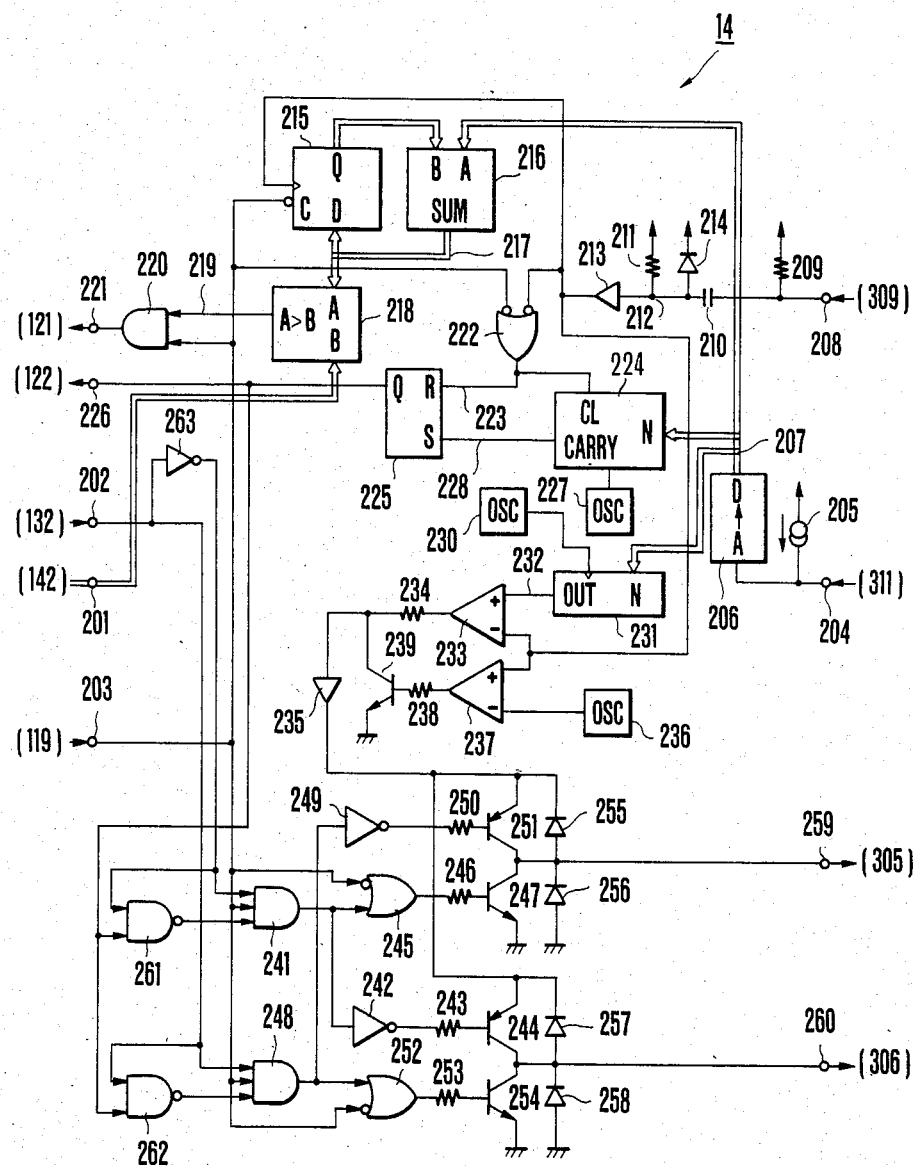
FIG. 8 is a typical circuit diagram for a drive control unit shown in FIG. 2.

FIG. 8 illustrates one example of the drive control unit 14 (FIG. 1). The drive control unit 14 is arranged as follows: The control unit 14 drives the lens through the distance, or an extent that corresponds to the degree of defocus, typically the output from the terminal 142 from a drive indication or instruction unit 13 is coupled to a terminal 201. The output at the terminal 132, moreover, in which driving direction signal is supplied to a terminal 202. The signal inducting driving direction appears at the terminal 202 just for a period during which the drive signal at the output of the terminal 119 is applied to a terminal 203 and remains at a high level.

Figure 9:
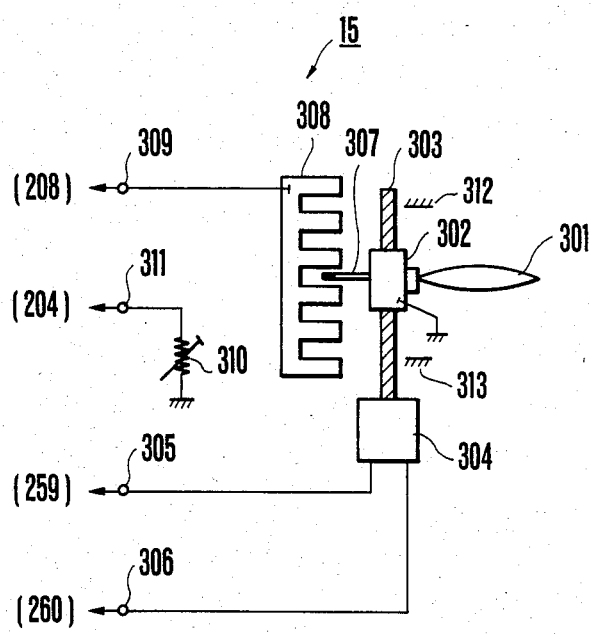
FIG. 9 is a schematic illustration of the drive unit shown in FIG. 2.

This unit 14 includes a lens drive monitor circuit portion that has a monitor terminal 208. To this terminal 208 is connected a comb-shaped contact 308 which is shown in FIG. 9. This comb-shaped contact 308 turns on and off every time the lens is moved a predetermined extent. The on and off states of the comb-shaped contact are detected by circuit elements including resistors 209 and 211, a capacitor 210 and an amplifier 213. These circuit elements form a pulse generating circuit which produces a pulse signal output every time the contact 308 turns on.

Within this pulse generating circuit, the capacitor 210 and the resistor 211 form a time constant circuit, which prevents "contact chatter" at the contact 308. The diode 214 prevents the potential of a point 212 from becoming abnormally high. The pulse forming circuit normally produces a high level output and only produces a low level output when the contact 308 turns on for a period of time that corresponds to the time constant defined by the resistor 211 and the capacitor 210. The pulse signal mentioned above is formed by these high and low level outputs of the pulse forming circuit.

The unit further includes a computing circuit portion in which: A conductor 207 receives a digital signal that corresponds to a defocus degree, or focus shifting extent as a consequence of driving a lens through a distance during a time in which pulses are produced from the pulse generating circuit as described later herein. In other words, because one pulse is generated from the pulse generating circuit every time the comb-shaped contact 308 is closed, that is, every time the lens moves through a distance that corresponds to the separation between two adjacent teeth in the comb 308, the extent of lens movement (or focus shifting extent) which takes place every time one pulse is produced from the pulse forming circuit can be predetermined. Therefore, a digital value (hereinafter referred to as a defocus degree/pulse value) which corresponds to the shift in focus distance per pulse is supplied from the conductor 207 to a circuit which will be described below:

The digital value of the signal in the conductor 207 is impressed on an input terminal A of an adder 216. The adder 216 then adds together the digital value and a signal received at another input terminal B. A further signal representing the sum thus obtained is coupled to a conductor 217. The sum value signal from the conductor 217 is supplied, in synchronism with the pulses from the pulse generating circuit, to a register 215 which consists of a DFF for a plurality of bits. The output of this register is impressed on the input terminal B of the adder 216. In these circumstances, the lens movement extent (defocus degree) per pulse from the line 207 is accumulated at the register 215 every time a pulse is produced through the pulse generating circuit. The register 215 thus stores a digital value which corresponds to number of pulse generated × the degree of defocus per pulse, i.e. a cumulative defocus degree up to that point of time.

A magnitude comparator 218 compares this latter above defocus degree signal (which is impressed on an input terminal B of the comparator 218) with a signal that is impressed on another input terminal A of the comparator. Because a digital value corresponding to the extent of lens movement up to that time is stored at the register 215 as mentioned above, when the lens is moved through a distance that is as much as the defocus degree computed by the circuit shown in FIG. 3 during the lens driving process, the input A to the comparator 218 becomes larger than the input B. This results in a high level output signal in a conductor 219.

The terminal 203, which is connected to the terminal 119, produces a high level output at terminal Q of the DFF 118 (FIG. 5) during the lens driving process as mentioned in the foregoing. Therefore, when the lens driving process to the defocus degree comes to an end as mentioned above, an AND gate 220 produces a high level output. The output level of the terminal 119 then changes from a high level to a low level to bring the lens driving action to an end. Further, the register 215 resets when the level of the driving signal of the terminal 203 is low, that is, the register is clear when the lens is not driven.

Further included in the unit is a lens limit detection circuit element, which is arranged as follows: The output level of the terminal 203 is low when the lens is not driven because the level of the output Q of the DFF 118 shown in FIG. 5 is low as mentioned above. When the lens is not driven, therefore, the signal level in the output conductor 223 of an inversion input OR gate 222 becomes high to reset a frequency divider 224 and an RS flip-flop 225. Accordingly, the level of the output Q of the flip-flop 225, i.e. the level of an end signal terminal 226 of the flip-flop 225 becomes low.

During the lens driving process on the other hand, the output level of the terminal 203 becomes high. This causes the output level of the inversion input OR gate 222 to become low unless the output level of the amplifier 213 of the pulse forming circuit changes to a low level (that is, unless the comb-shaped contact 308 turns on or is actuated in relation to the lens movement). As the output level of the OR gate 222 thus stays low, the frequency divider 224 is released from a cleared state and begins to count the pulses from an oscillator 227. When a number of pulses designated by the signal at a point, or junction 207 have been thus counted, the frequency divider 224 causes the signal level in the conductor 228 to become high and produce a "carry" output.

In other words, the "carry" output is produced when no pulse comes from the pulse forming circuit for a period of time longer than a predetermined length of time after receipt of instruction to drive the lens. With the "carry" output thus produced, the flip-flop 225 is set to produce a high level signal at the terminal 226 to show that a limit of lens travel has been reached. More specifically, in order to stop the lens at arrival at a limit, the comb-shaped contact 308 no longer performs an on-and-off action and no pulse is produced from the pulse function generating circuit thereafter. In that case, therefore, the frequency divider 224 produces the "carry" output to establish high level signal at the terminal 226 to indicate the limit, so that the operation described in Para (2)-(c) above can be carried out accordingly. In the case where the lens has not reached the travel limit, the comb-shaped contact 308 of course turns on and off within the predetermined period of time. The output level of the amplifier 213 then changes to a low level to make the output level of the inversion input OR gate 222 high. This high level output clears the frequency divider 224. Consequently, no "carry" output is produced and, therefore, no high level output signal is established at the terminal 226.

The arrangement to detect the lens limit through the change or lack of change in the pulse signal that is generated in relation to the lens driving process permits the drive monitoring operation to be adequately accomplished with use of only a single signal conductor. Further, there is the possibility that the defocus degree (focus shifting extent) relative to the extent of lens movement fluctuates with variations in the zooming condition and design of the lens. To keep the defocus degree per unit time always constant or unvarying the extent of lens movement relative to a given defocus degree or extent of focus shifts must be varied according to the zooming condition and the kind of lens in use. This requires an arrangement to adjust the extent of lens movement per unit time according to the zooming condition, and the like. As a result of this arrangement, the period or cycle of pulses established by the pulse generating circuit varies.

Therefore, if the above-mentioned time for time count by the frequency divider 224 is chosen to be constant, there would be a problem, for example, when the pulse period or cycle becomes longer and no pulse is produced within the above stated period of time. In such a case, a limit detecting action would be performed before the lens has not yet actually come to the travel limit.

In accordance with the invention, therefore, a signal representative of a defocus degree per pulse from the junction 207 is supplied to the frequency divider 224. With this signal supplied, the frequency dividing ratio of the frequency divider 224 is varied to change the count time as required.

For example, where the defocus degree is selected to equal N if the extent of lens movement per unit time is D and one pulse is produced when the lens moves through the distance D, the limit detection can be accurately accomplished by setting the time count by the frequency divider 224 to correspond to a length of time of $A+\alpha$ which is slightly longer than the unit time A. Assuming further that the defocus degree is adjusted to become N when the extent of movement is D/2, if the defocus degree per unit time remains N, the extent of movement per unit time must be multiplied by ½ to make it D/2. Then the pulse produced per unit time A becomes ½ pulse. As a result, no pulse would be produced within the counting time A and then the lens would be considered to have reached a limit before it actually reaches the limit. In that instance, therefore, the time count time must be doubled to make it 2A. To solve this problem in accordance with the invention, the frequency dividing ratio of the frequency divider 224 is varied to adjust the time in response to the signal at the junction 207. For example, the frequency dividing ratio is varied according as the defocus degree per pulse becomes N or becomes 2N.

There is also provided a circuit element for controlling the lens driving power. When the driving power and speed of the motor vary with the lens or when the frequency of the pulses relative to the lens position varies, this circuit element serves to compensate for such variations. In this circuit element, the output of a reference oscillator 230 is frequency divided at a variable frequency divider 231 by the signal from the junction 207, which signal corresponds to the ratio (defocus degree)/(one pulse interval).

The frequency divider 231 generates reference period pulses. The phase of the reference pulses and that of the pulses from the pulse forming circuit mentioned in the foregoing are detected and the driving speed of the motor is kept constant by a circuit which is arranged as will be described later herein.

Thus, in order to make the defocus degree per unit time always unvarying despite changes in the defocus degree associated with the extent of lens movement or the shift in lens position, irrespectively of zooming conditions, and the like, the extent of lens movement per unit time, or the lens driving speed must be adjusted. For this purpose, in accordance with the invention, a signal which represents a defocus degree per pulse from the junction 207 is applied to the frequency divider 231 to control the frequency dividing ratio. More specifically, assuming that the defocus degree per pulse is N, the cycle of the frequency divider 231 is A and under this condition the motor is running at a speed S, the speed must be adjusted to ½S when the defocus degree per pulse become 2N. Without such adjustment it is not possible to retain the defocus degree per unit time at a given constant value N. Consequently, the reference frequency from the frequency divider 231 must be adjusted to 2A and the motor must be synchronized with this cycle reference.

To attain this purpose, the signal of the junction 207, which represents the defocus degree per pulse, is used to control the frequency dividing action of the frequency divider 231 to adjust the reference frequency. The reference frequency pulses are applied, together with the pulses that reflect the actual lens movement from the amplifier 213, to a phase comparator 233. The phase comparator 233 has a phase locked loop and a low-pass filter for its output. The comparator 233 produces a high level output when the frequency of the pulses associated with the lens is lower than the reference pulse frequency. A low level output is generated through the comparator 233, however, when the reference pulse frequency is lower than the pulse frequency that represents the lens movement.

The output of the comparator 233 is transmitted through an amplifier 235 to increase or decrease the power for the motor until a signal which gives about the same pulse frequency as the reference pulse frequency is obtained through a feedback process. This arrangement prevents the response speed from varying and the inconvenience that would result from an erroneous action in the limit detecting circuit element.

An oscillator 236 is a limiting oscillator that prevents the pulses associated with the lens from reaching an excessively high frequency having too high a pulse repetition rate to permit them to be distinguished from "chattering" or from becoming uncontrollable. A phase comparator 237, having a phase locked loop with a low-pass output filter compares the lens associated pulses with the output pulses from the oscillator 236. When the lens associated pulse repetition rate is abnormally high, the comparator 237 produces a high level output signal which turns on an npn transistor 239 through a resistor 238. With the transistor 239 turned on, the speed control (stabilizing control over the extent of the shift in the focal plane through the phase comparator 233 is restricted to prevent the lens associated pulse repetition rate from becoming too high and thus to prevent an error in operation. In other words, with the transistor 239 turned on, the input level of the amplifier 235 is lowered to restrict the motor power and to reduce the motor speed, so that the driving system can be adjusted for different lenses.

Also provided in the unit is a motor drive circuit element in which: When the lens is not driven, the low level output of the terminal 203 renders the output level of the gate 241 low. The low level output from the gate 241 causes the output level of an inverter 242 to become high. The high level output of the inverter 242 turns off a pnp transistor 244 through a resistor 243. Meanwhile, a low level inversion input to an OR gate 245 results in a high level output signal, which turns on an npn transistor 247 through a resistor 246. Because the output level of another AND gate 248 is also caused to become low, the output level of an inverter 249 becomes high to turn off a npn transistor 251 through a resistor 250. An inversion OR gate 252 also has a low level inversion input and thus produces a high level output to turn on an npn transistor 254 through a resistor 253. With the transistors 247 and 254 turned on and by virtue of diodes 255 through 258, which prevent these transistors from being damaged by a back electromotive force from the motor, motor terminals 259 and 260 are short-circuited to apply an electromagnetic brake to the motor.

While the lens has not reached the limit, the output Q of the flip-flop 225 is at a low level. Therefore, the output levels of NAND gates 261 and 262 are high.

Assuming that the output level of the terminal 203 becomes high to drive the lens when the output level of the driving direction terminal 202 is high, the output level of the AND gate 248 becomes high. The output level of the OR gate 252 also becomes high. The transistor 254 turns on. A low output level from the inverter 249 then causes the transistor 251 to turn on. Further, since the output level of the AND gate 241 is low, the output level of the OR gate 245 is low. Accordingly, the transistor 247 turns off. Further, since the output level of the inverter 242 is high, the transistor 244 also turns off. As a result of that, the output (positive) of the amplifier 235 is applied to a terminal 259. Meanwhile, another terminal 260 is grounded by the transistor 254 to cause the motor to drive the lens in the desired direction. The output level of a NAND gate 262 becomes low to stop the motor from driving when the lens reached the limit.

In case the lens is to be driven in the opposite direction, when the level of the terminal 203 is high while that the terminal 202 is low, the output level of the AND gate 241 becomes high. The output level of the OR gate 245 becomes high to turn on the transistor 247. Meanwhile, the output level of the inverter 242 becomes low to turn on the transistor 244. Further, with the output level of the AND 248 becoming low, the output level of the OR gate 252 also becomes low to turn off the transistor 254. With the output level of the inverter 249 being at a high level, the transistor 251 turns off. As a result of that, the output (positive) of the amplifier 235 is applied to the terminal 260 while the transistor 247 turns on to ground the terminal 259. Then, the motor drives the lens in a direction opposite to the direction mentioned in the foregoing. Upon arrival of the lens at the limit, the output level of the NAND gate 261 becomes low to stop the motor from driving. The brake is applied in the same manner as in the above stated case when the driving action is stopped by the low output level of the driving terminal 20.

The drive unit 15, which has been mentioned in the foregoing description, is shown in an illustration embodiment in FIG. 9. The circuit shown in FIG. 9 corresponds, for example, to an interchangeable lens for a single-lens reflex camera. In this example, a photographic lens 301 is shifted in position through a motor 304 in response to signals from terminals 305 and 306 through a worm gear or reduction mechanism 302 and 303. The same focusing mechanism can be applied to an entire lens assembly as well as to moving a front lens or part of other movable lens groups. In this case, the pulses associated with the lens are applied to a motor terminal 309 through a brush 307 associated with the lens 301 as the lens position is shifted to complete a circuit to ground by engaging individual teeth in the comb-shaped electrode 308. The unit, moreover, is provided with a resistor 310 which has its resistance value adjusted to set information on the (defocus degree)/(pulse interval). This information signal is applied to a terminal 311. The information signal from the terminal 311 then is converted into a digital value by the A-D converter 206 (FIG. 8) in the same manner as has been described in the foregoing. Further, if the resistor 310 is arranged through its resistance in relation to the zooming action of a zoom lens, the value of the above stated information signal also can be adjusted according to the zoom ratio of the lens. Such an arrangement then enables changes in the extent of lens movement due to zooming and the defocus degree (focus shifting extent) to be automatically transmitted to the aforementioned circuits which are connected to the junction 207, so that the extent in the focus shift per time unit can be kept constant.

Also included are mechanical stops 312 and 313 which limit the forward and backward movements of the lens. When the lens abuts one of the stop members 312 and 313, the stopping action is detected by the limit detecting circuit portion of the drive control unit 14 shown in FIG. 8. Upon detecting that the lens movement has thus been stopped, the lens drive is stopped too, so that the limit control can be accomplished without recourse to additional switches or the like.

Figure 10:
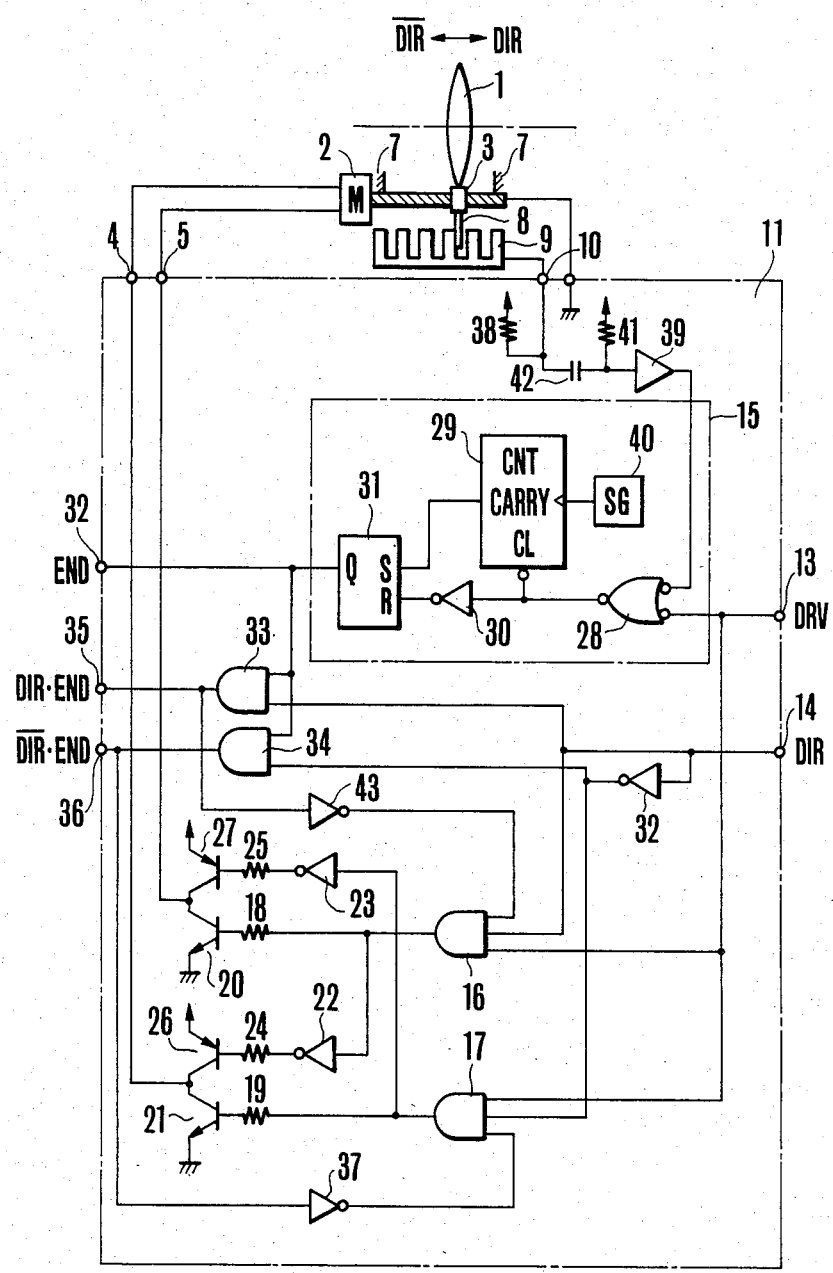
FIG. 10 is a circuit diagram that illustrates examples of a limit detection circuit and a drive control circuit shown in FIG. 8.

In another embodiment of the invention, the lens limit detecting circuit portion and the motor drive circuit elements shown in FIGS. 8 and 9 are modified as shown in FIG. 10. Referring now to FIG. 10, in this embodiment, a focusing lens 1 is focused by means of a motor 402 and a feed screw 403. Mechanical stops 407 are provided at both ends of the range lens motion. In focusing, a signal (a monitor signal) relative to a lens driving process is generated jointly through a brush 408 and a conductive pattern 409 and this monitor signal is coupled to a terminal 410. The motor 402 is provided with drive signal input terminals 404 and 405, which correspond to the terminals 305 and 306 of FIG. 9. A motor control circuit 411 has a lens drive signal input terminal 413 which corresponds to the terminal 203 of FIG. 8 and a drive direction signal input terminal 414 which corresponds to the terminal 202 of FIG. 8. The motor control circuit controls the motor 402 by means of input signals DRV and DIR from these input terminals 413 and 414 and the output of a limit detection circuit 415. The embodiment operates as follows:

When the lens 1 is not to be driven, a low level input is impressed on the drive signal input terminal 413. Therefore, the output levels of AND gates 416 and 417 become low. The low level outputs of these AND gates 416 and 417 turn off npn transistors 420 and 421, respectively, through resistors 418 and 419. Concurrently with this, the output levels of inverters 422 and 423 become high to also turn off respective gap transistors 426 and 426 through resistors 424 and 425. This causes the motor drive terminals 404 and 405 to open in order to render the motor inoperative. The output level of an AND gate 428 becomes low as the level of one of the inputs becomes low. The low output of the gates 428 clears a counter 429. An inverter 430 then makes the output of the inverter high to reset as RS flip-flop 431. Then, the output Q of the flip-flop 431 causes the level of the limit signal terminal 432 to become low. The output levels of AND gates 433 and 434 also become low to cause the levels of discrete limit signals 435 and 436 to become low.

In a case in which the lens is to be driven with the direction signal input terminal at a low state, since the level of the drive signal input terminal 413 is high in this case, the output level of the AND gate 416 becomes low and that of an inverter 432 high. If the output level of an inverter 437 is high, that of the AND gate 417 becomes high to turn on the transistor 421 through the resistor 419. Then, with the output level of the inverter 422 becoming high concurrently with that, the transistor 426 is turned off through the resistor 424. Accordingly, the level of the terminal 404 becomes low. Meanwhile, the output level of the inverter 423 becomes low to turn on the transistor 427 through the resistor 425. Since the low output level of the AND gate 416 turns off the transistor 420 through the resistor 418 at the same time, the level of the terminal 405 becomes high. With the level of the terminal 405 becoming high, power is supplied to the motor 402 to move the lens 401 by means of the screw 403 to the right, for example.

Assuming that the pattern 409 is a comb-shaped electrode this lens movement results in a comb-like signal produced at the terminal 410 which is formed through successive contacts between the individual teeth in the conductive pattern 409 and the brush 408. When no change occurs in this comb tooth signal, the output level of a buffer amplifier 439 becomes high after a length of time elapses, the duration of which is defined by a CR time constant circuit which consists of a capacitor 442 and a resistor 441. Then the levels of both inputs of the AND gate 428 become high and the gate 428 produces a high level output. This results in a low level output from the inverter 430. The RS flip-flop 431 is released from a reset state. At the same time, the counter 429 is also released from a cleared state and begins to count pulses produced from a pulse generator 440.

When no change takes place in the comb tooth signal for a given length of time, the counter 429 then produces a carry signal to set the flip flop 431 and to make the level of the end signal terminal 432 high. Meanwhile, the level of the output of the AND gate 434, that is, the level of a DIR-END terminal 436 is also caused to become high. Further, the output level of the inverter 437 becomes low. This causes the output level of the AND gate 417 to become low to inhibit lens driving action in the same direction.

If the comb tooth signal changes, that is, becomes grounded, the output level of the buffer amplifier 439 is lowered for a given length of time by means of the resistor 441 and the capacitor 442. Then, the flip-flop 431 is reset and the counter 429 is cleared through a signal from the AND gate 428. In other words, when the lens is moved to the position of the stop 407, the comb tooth signal does not change even after the carry time of the counter 429 has elapsed. Therefore, an end signal is produced to stop the lens driving action. The lens then halts at a drive limit position.

The operation is performed in the same manner also for the reverse direction. In that case, the level of the direction signal input terminal 414 is high. Then, when the level of the drive signal input terminal 413 also becomes high, the output level of the inverter 443 stays high to make the level of the terminal 404 high and that of terminal 405 low. This causes the lens to be driven in the reverse direction until the motion in that direction is ended by the AND gate 433. The above stated CR time constant circuit, which consists of the capacitor 442 and the resistor 441, may be adjusted to the comb-tooth signal for the purpose of preventing erroneous action due to "chattering" or, in some cases, for the purpose of responding to a signal representing the rise of the comb-tooth signal from ground. Further, arrangement can be added to connect display elements, such as light emitting diodes, to the terminals 435 and 436 to indicate that the lens has reached the infinity position and the close-up position.

Figure 11:
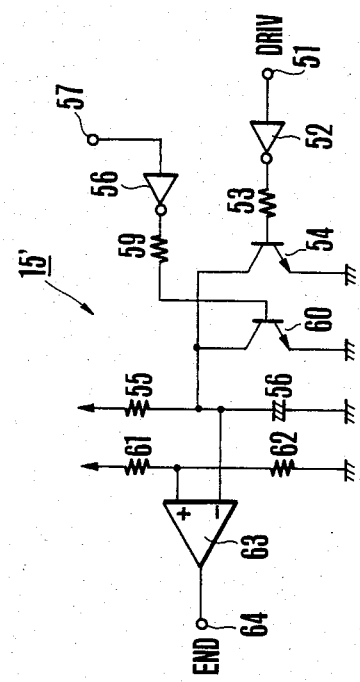
FIG. 11 is a circuit diagram showing another example of a limit detection circuit.

In a further embodiment of the invention, the limit detection circuit 415 shown in FIG. 10 is modified as shown in FIG. 11. In this case, the drive input signal of the terminal 413 mentioned in the foregoing is received as a terminal 451. When the lens is not driven, the output level of an inverter 452 becomes high. The high level output of the inverter 452 then turns on an npn transistor 454 through a resistor 453 to discharge a capacitor 456 through a resistor 455.

The level of the END signal becomes low when the lens is not driven. When the lens is to be driven on the other hand, the above stated transistor 454 is turned off to charge the capacitor 456 and the output of the above stated buffer amplifier 439 (FIG. 10) is applied to a terminal 457. In this condition, a transistor 460 is turned on by a change in the comb-tooth signal and the charge on the capacitor 456 is discharged only when the comb-tooth signal changes. Such being the arrangement, the charge level of the capacitor 456 becomes higher than a voltage defined by resistors 461 and 462 when the comb-tooth signal remains unchanged for a given length of time after the lens is driven in the same manner as described in the foregoing. With the charge level of the capacitor 456 thus becoming higher, the output level of a comparator 463 and that of a terminal 464 become high.

Further, in the embodiment described above, the comb-tooth signal may be generated through some non-contact means such as a photo-electrical interrupter or the like. In that case, because a power source for a light source is to be used only during a lens driving process the power supply for the motor can be used for that purpose. This arrangement prevents "chattering" and permits the comb teeth of the monitor to be more closely spaced in order to reduce size. Further, the lens driving speed may be increased by gear means or the like. In addition to the above stated photo-electric shifting extent detecting arrangements by photo-electric conversion, detection can be also effectively accomplished by some electromagnetic conversion means or by using an Hall-effect element.

As has been described in the foregoing, arrival of the lens at a limit position during a lens driving process is detected through a change in the monitor signal. Compared with the conventional devices which use limit switches, the structures that characterize the invention not only more accurately perform limit detection but also permit control on the basis of a signal representative of the extent of the shift in focus of the lens per unit time. Therefore, in carrying out a focusing operation, the extent of focus shift per unit time can be always adjusted to a constant value even where the zoom ratio of the lens varies.

What we claim:

1. An automatic focusing device, comprising:
   (a) an automatic focusing circuit which performs distance adjustment by automatically shifting the position of a lens to an in-focus position, said focusing circuit including lens driving means and said focusing circuit being arranged to have the lens driven by said driving means to a position determined by the output of the focusing circuit;
   (b) monitor signal forming means for forming a monitor signal relative to the movement of said lens;
   (c) a limit signal forming circuit arranged to detect said monitor signal and to form a limit signal when the monitor signal is not produced within a predetermined length of time, and
   (d) reversing means for reversing the lens driving direction of said lens driving means in response to said limit signal.

2. An automatic focusing device according to claim 1 wherein said limit signal forming circuit includes a timer circuit for starting a counting action in response to the extinction of said monitor signal and for returning to an initial counting state in response to generation of said monitor signal.

3. An automatic focusing device according to claim 1 wherein said limit signal forming circuit is arranged to form said limit signal when said monitor signal is not produced within a predetermined length of time determined by the kind of the lens or the lens' zoom ratio.

4. A limit detection circuit for an automatic focusing device having an automatic focusing circuit which is arranged to drive a lens by lens driving means and to perform distance adjustment by automatically shifting the lens to an in-focus position, said limit detection circuit comprising:

(a) monitor signal forming means for forming a monitor signal, said means being arranged to vary the output thereof in relation to the movement of said lens; and (b) a timer circuit for performing a time counting action said timer circuit counting a predetermined time and forming a limit signal indicating that the lens has arrived at the shiftable limit position when the monitor signal does not change for period of time longer than the predetermined time, said predetermined time of the timer circuit being determined according to the type of lens or zoom ratio of the lens; and the length of time from the start of the time counting action of said timer circuit to the end thereo being determined on the basis of said information.

5. An automatic focusing device, comprising:

(a) an automatic focusing circuit which performs distance adjustment by automatically shifting the position of a lens to an in-focus position, said focusing circuit including lens driving means and said focusing circuit being arranged to have the lens driven by said driving means to a position determined by the output of the focusing circuit;

(b) a monitor signal forming circuit which forms a monitor signal in relation to the shift of the lens position, said monitor signal representing information on the shifting speed of the lens;

(c) an information forming circuit which forms an information signal representative of a reference shifting speed corresponding to a focus shifting extent per unit time resulting from the shift of said lens position; and (d) a control circuit arranged to detect said monitor signal and to adjust the driving speed of said driving means for reduction of difference between said reference shifting speed represented by said information signal and said lens shifting speed represented by said monitor signal.

6. An automatic focusing device according to claim 5, further including a high speed limit circuit for detecting said monitor signal and producing an output when the shift speed represented by said monitor signal exceeds a high speed limit value higher than said reference shifting speed, the output of said high speed limit circuit being arranged to cause said control signal forming circuit to form a signal for quick reduction of the lens driving speed of said driving means irrespective of the difference of said shifting speed from said reference shifting speed.

7. An automatic focusing device, comprising:

(a) an automatic focusing circuit which performs distance adjustment by automatically shifting the position of a lens to an in-focus position, said focusing circuit including lens driving means and said focusing circuit being arranged to have the lens driven by said driving means to a position determined by the output of the focusing circuit;

(b) a monitor signal forming circuit which forms a monitor signal in relation to the shift of the lens position, said monitor signal representing information on the shifting speed of the lens;

(c) an information forming circuit which forms an information signal representative of a reference shifting speed corresponding to a focus shifting extent per unit time resulting from the shift of said lens position; and (d) a speed control signal forming circuit which detects said monitor signal and said information signal and is arranged to form a deceleration signal when the monitor signal is indicative of that the shifting speed is higher than said reference shifting speed and to form an acceleration signal when the monitor signal is indicative of that the former is lower than the latter, said driving means being arranged to adjust the lens driving speed thereof according to the deceleration or acceleration signal from said speed control signal forming circuit.

8. An automatic focusing device according to claim 7, further including a high speed limit circuit which detects said monitor signal and produces an output when the shifting speed represented by said monitor signal comes to exceed a high speed limit value which is higher than said reference shifting speed, the output of said high speed limit circuit being arranged to cause said control signal forming circuit to form a signal for quick reduction of the lens driving speed of said driving means irrespective of the difference of said shifting speed from said reference shifting speed.

9. An automatic focusing device, comprising:

(a) an automatic focusing circuit which performs distance adjustment by automatically shifting the position of a lens to an in-focus position, said focusing circuit including lens driving means and said focusing circuit being arranged to have the lens driven by said driving means to a position determined by the output of the focusing circuit;

(b) a monitor signal forming circuit which forms a lens shift pulse signal in relation to the shift of lens position, said pulse signal having pulse information such as frequency corresponding to the shifting speed of said lens position;

(c) a reference pulse circuit which forms a pulse signal having pulse information such as frequency representing a reference shifting speed corresponding to a focus shifting extent per unit time resulting from the shift of the lens position;

(d) a speed control signal forming circuit which detects said pulse signal from said monitor signal forming circuit and the pulse signal from said reference pulse circuit and is arranged to form a deceleration signal when the shifting speed represented by the pulse information from said monitor signal forming circuit is higher than said reference shifting speed and to form an acceleration signal when the former is lower than the latter, said driving means being arranged to increase or decrease the lens driving speed thereof according to the signal produced from said speed control signal forming circuit.

10. A device as in claim 9, wherein the information representing the shifting speed and the reference shifting speed is the pulse frequency.

11. An automatic focusing device arranged to shifting a lens to an in-focus position, said device having a limit detection circuit for detecting arrival of the lens at a limit position, comprising:

(a) monitor signal forming means for forming a monitor signal relative to the movement of the lens;

(b) a timer circuit for setting a clock time according to the set conditions of the lens; and (c) detection means for detecting arrival of the lens at the limit position when generation of the monitor signal cannot be detected within the clock time of the timer circuit.

12. An automatic focusing device as in claim 11, wherein said limit detection circuit is arranged to form a limit signal when said monitor signal is not produced within a predetermined length of time determined by the kind of lens or the len's zoom ratio.

13. An automatic focusing device which is arranged to shifting a lens to an in-focus position, said device having a limit detection circuit for detecting arrival of the lens at a limit position, comprising:
    (a) monitor signal forming means for forming a pulse signal train during the movement of the lens;
    (b) a timer circuit for setting a clock time in accordance to the set conditions of the lens; and
    (c) detection means for detecting arrival of the lens at the limit position when generating of the monitor signal cannot be detected within the clock time of the timer circuit.

14. An automatic focusing device according to claims 11 or, 13 in which the set condition of the lens is the type of lens or the zooming condition.

15. A limit detection circuit for a focusing device arranged to shift a lens for adjusting a focus, comprising:
    (a) monitor signal forming meas for forming a monitor signal relative to the movement of the lens;
    (b) a timer circuit for setting a clock time in according with the set conditions of the lens; and
    (c) detection means for detecting arrival of the lens at the limit position when generation of the monitor signal cannot be detected within the clock time of the timer circuit.

16. A limit detection circuit for a focusing device arranged to shift a lens for adjusting a focus, comprising:
    (a) monitor signal forming means for forming a pulse signal train during the movement of the lens;
    (b) a timer circuit in which clock time is set in accordance to the set conditions of the lens; and
    (c) detection means for detecting arrival of the lens at the limit position when generation of the monitor signal cannot be detected within the clock time of the timer circuit.

17. Lens drive speed control device for focusing device arranged to shift a lens for adjusting a focus comprising:
    (a) a monitor signal forming circuit for forming a monitor signal representing a shift speed of the lens;
    (b) reference speed signal forming circuit for forming a reference signal representing a reference speed corresponding to focus shift per unit time; and
    (c) a control circuit for detecting the monitor signal and the reference signal to control the shift speed of the lens in correspondence to the reference speed.

18. An automatic focusing device, comprising:
    (a) an automatic focusing circuit for performing distance adjustment by automatically shifting the position of a lens to an in-focus position, said focus circuit including lens driving means and said focusing circuit being arranged to drive the lens said driving means to a position determined by the output of the focusing circuitl;
    (b) monitor signal forming means for forming a monitor signal relative to the movement of said lens;
    (c) a limit signal forming circuit arranged to detect said monitor signal and to form a limit signal when the monitor signal is not produced within a predetermined length of time; and
    (d) inhibiting means arranged to inhibit the lens driving action of said lens driving means in response to said limit signal;
    (e) said limit signal forming circuit being arranged to form the limit signal when the monitor signal is not produced within a predetermined length of time deteremined by the kind of the lens or the lens' zoom ratio.

* * * * *